(12) United States Patent
Kobuse

(10) Patent No.: US 10,027,919 B2
(45) Date of Patent: Jul. 17, 2018

(54) SIGNAL PROCESSING APPARATUS, IMAGE CAPTURING APPARATUS, CONTROL APPARATUS, SIGNAL PROCESSING METHOD, AND CONTROL METHOD

(71) Applicant: CANON KABUSHIKI KAISHA, Tokyo (JP)

(72) Inventor: Takenori Kobuse, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/445,273

(22) Filed: Feb. 28, 2017

(65) Prior Publication Data

US 2017/0257591 A1 Sep. 7, 2017

(30) Foreign Application Priority Data

Mar. 2, 2016 (JP) ................................. 2016-040440

(51) Int. Cl.
*H03M 1/82* (2006.01)
*H04N 5/378* (2011.01)
*H04N 9/04* (2006.01)
*H04N 5/365* (2011.01)

(52) U.S. Cl.
CPC ........... *H04N 5/378* (2013.01); *H04N 5/3655* (2013.01); *H04N 9/045* (2013.01)

(58) Field of Classification Search
CPC ....... H04N 5/378; H04N 5/3655; H04N 9/045
USPC ............................................. 341/155–170
See application file for complete search history.

(56) References Cited

U.S. PATENT DOCUMENTS

| 6,421,146 B1* | 7/2002 | Yoo ...................... H04N 1/4076 358/461 |
| 2009/0225211 A1* | 9/2009 | Oike ................... H03M 1/1023 348/308 |
| 2010/0110231 A1* | 5/2010 | Funabashi .............. H04N 5/185 348/234 |
| 2011/0130971 A1* | 6/2011 | Goode, Jr. ........... A61B 5/0031 702/19 |
| 2015/0130971 A1* | 5/2015 | Oike ..................... H03M 1/186 348/241 |
| 2016/0212365 A1* | 7/2016 | Kato ...................... H04N 5/378 |
| 2016/0219229 A1* | 7/2016 | Kimura ................. H04N 5/378 |
| 2017/0324918 A1* | 11/2017 | Takatsuka .............. H04N 5/363 |

FOREIGN PATENT DOCUMENTS

JP 2011-211535 A 10/2011

* cited by examiner

*Primary Examiner* — Lam T Mai
(74) *Attorney, Agent, or Firm* — Cowan, Liebowitz & Latman, P.C.

(57) ABSTRACT

A signal processing apparatus comprising: an analog-digital converter that converts an analog signal output from a pixel section of an image sensor to a digital signal using a plurality of reference signals having different slopes from each other; and a determination unit that determines a signal level at which the plurality of reference signals are changed based on a distribution of the converted digital signal, wherein the analog-digital converter performs the conversion using a reference signal having a steeper slope when the analog signal is equal to or greater than the signal level than when the analog signal is smaller than the signal level.

11 Claims, 14 Drawing Sheets

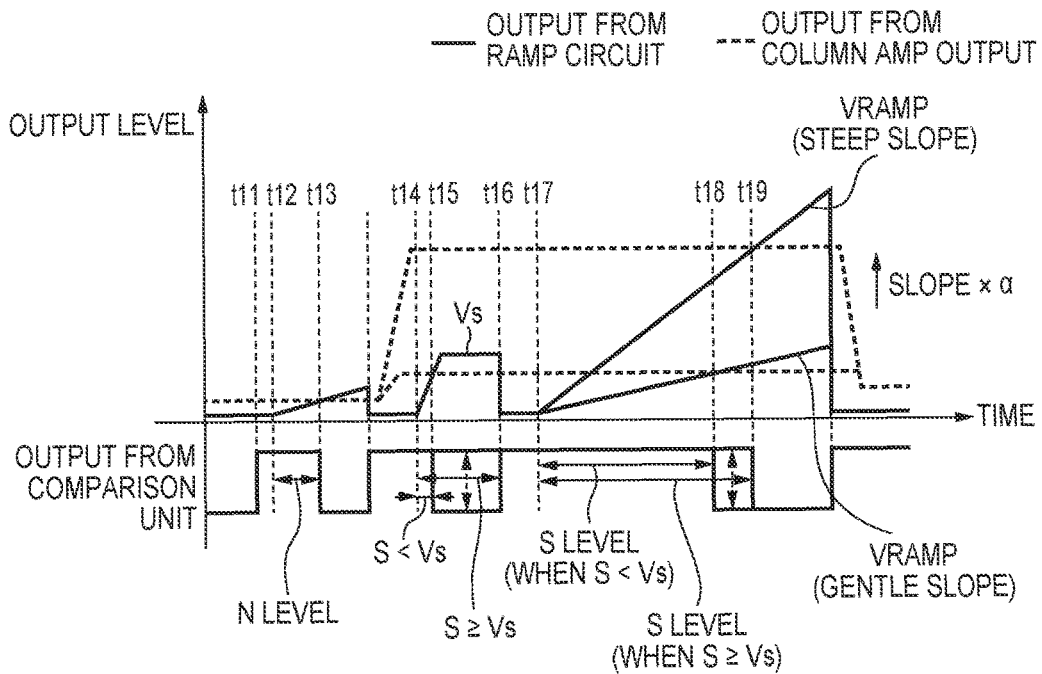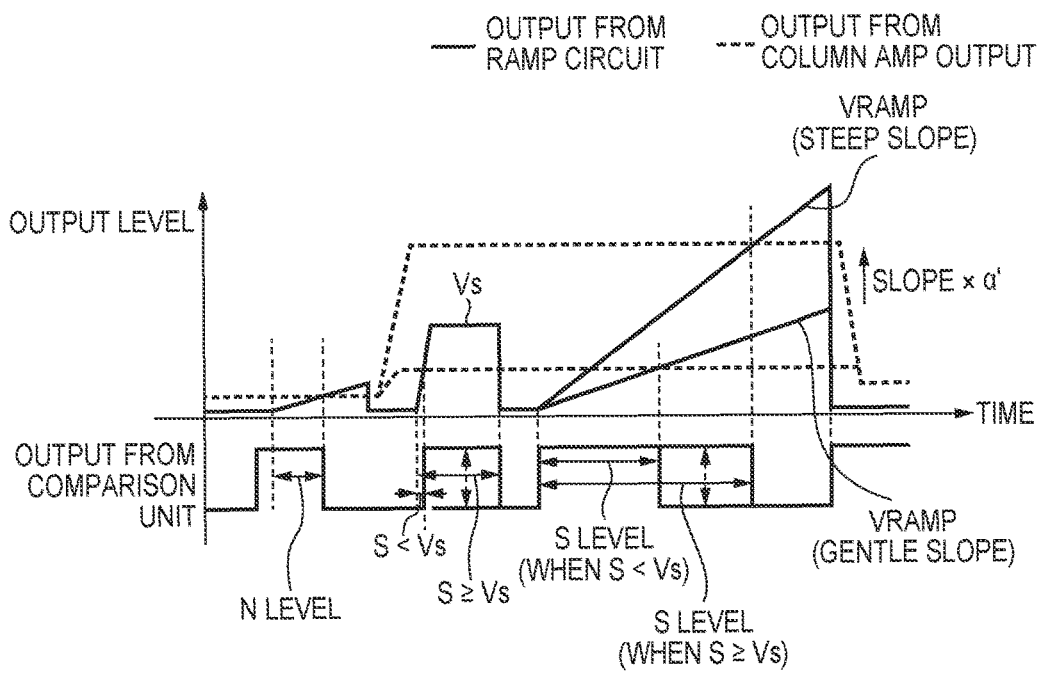

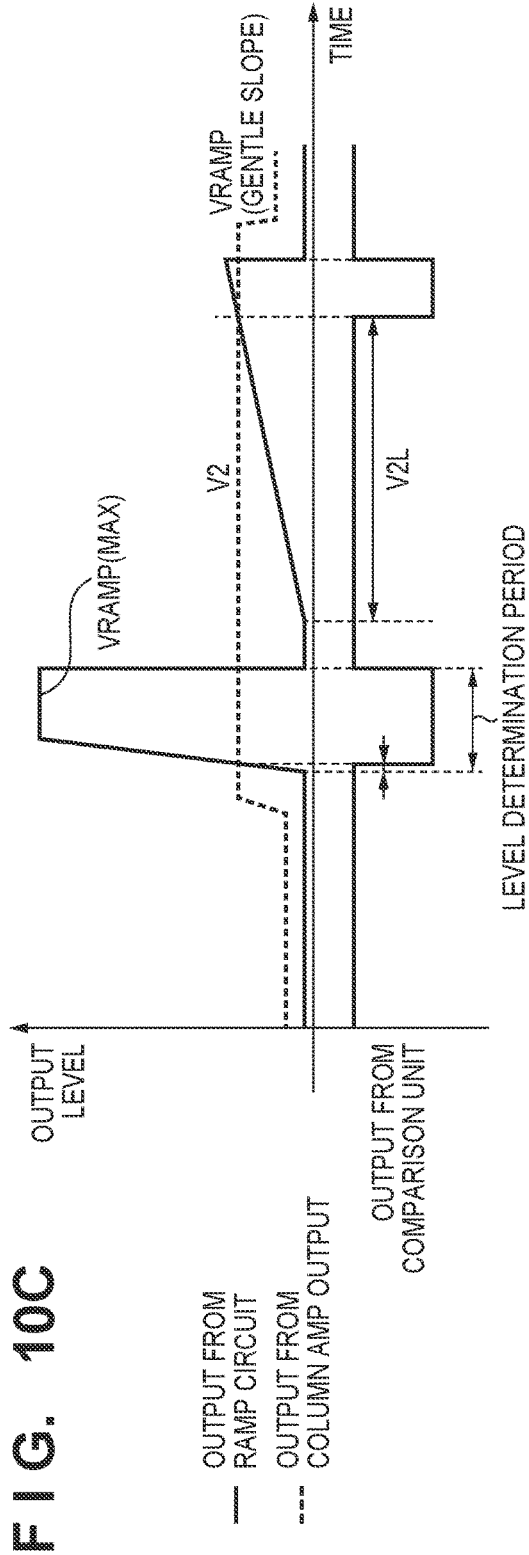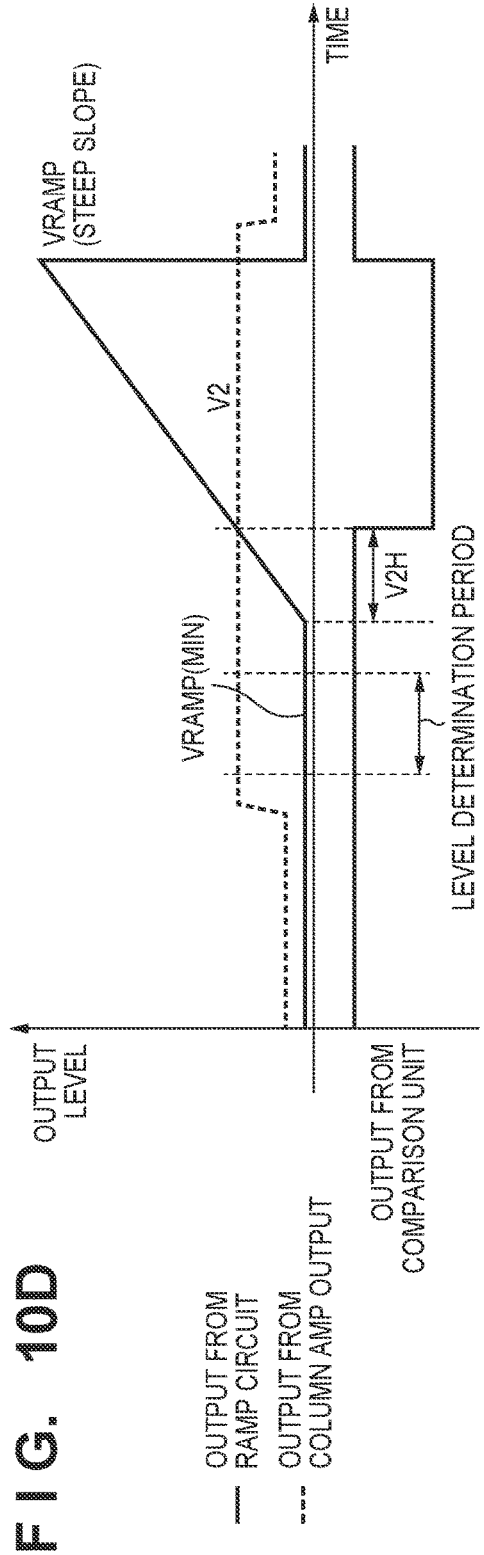

SIGNAL PROCESSING APPARATUS, IMAGE CAPTURING APPARATUS, CONTROL APPARATUS, SIGNAL PROCESSING METHOD, AND CONTROL METHOD

BACKGROUND OF THE INVENTION

Field of the Invention

The present invention relates to a signal processing apparatus, image capturing apparatus, control apparatus, signal processing method, and control method, and particularly relates to a signal processing apparatus, image capturing apparatus, control apparatus, signal processing method, and control method that perform analog-digital conversion.

Description of the Related Art

Recently, a common television standard has been changed from a television standard called "full high-definition", in which there are 1,920 horizontal pixels and 1,080 vertical pixels, to a television standard called "4K2K", in which there are 3,840 horizontal pixels and 2,160 vertical pixels, that are four times as much as pixels in a television standard called "high-definition". Further transitions to a next-generation television standard called "8K4K" ("ultra-high-definition"), in which there are 7,680 horizontal pixels and 4,320 vertical pixels, are expected in the future. As the number of pixels increases, framerates continue to increase as well.

The transition to such television standards has resulted in increased demand for more pixels and higher framerates in image capturing apparatuses that shoot video for television, and increasing the speed at which an image sensor for converting light into an electric signal reads out such video is an issue with respect to meeting such demand. To increase the readout speed, it is absolutely necessary to increase the processing speed of an AD converter provided in the image sensor.

Japanese Patent Laid-Open No. 2011-211535 discloses to compare pixel signals and a reference level, and perform analog-digital conversion on the pixel signals using ramp signals with different slope. More specifically, in a case where a pixel signal is larger than the reference level, the analog-digital conversion is performed on the pixel signal using a ramp signal with a first slope, and in a case where a pixel signal is equal to or less than the reference level, the analog-digital conversion is performed on the pixel signal using a ramp signal with a second slope, which is gentler than the first slope. In this manner, time to perform analog-digital conversion is shortened.

However, it is necessary to perform a bit shift operation on analog-digital converted signals using ramp signals with different slopes as described in Japanese Patent Laid-Open No. 2011-211535 so that the converted signals are in the same gain level. However, depending on the difference between the slopes, a bit gap caused by the bit shift operation may be perceivable in a video with respect to pixels whose signals before the bit shift operation have signal levels near the reference level that indicates the changing point of the ramp signals. In order to avoid the bit gap, it is considered to superimpose random noise (Dither) on pixel signals having signal levels near the reference level by an image processing unit of an image capturing apparatus so as to reduce unnaturalness in a video with respect to pixels having signal levels near the changing point of the ramp signals.

However, in this method, if many pixel signals of a video have signal levels near the reference level, the number of the pixel signals on which random noise is superimposed is large, and consequently, a video with more noise than usual may result.

SUMMARY OF THE INVENTION

The present invention has been made in consideration of the above situation, and, in a case of performing analog-digital conversion using a plurality of ramp signals having different slopes, reduces unnaturalness in a video with respect to pixels having signal levels near a changing point of the ramp signals.

According to the present invention, provided is a signal processing apparatus comprising: an analog-digital converter that converts an analog signal output from a pixel section of an image sensor to a digital signal using a plurality of reference signals having different slopes from each other; and a determination unit that determines a signal level at which the plurality of reference signals are changed based on a distribution of the converted digital signal, wherein the analog-digital converter performs the conversion using a reference signal having a steeper slope when the analog signal is equal to or greater than the signal level than when the analog signal is smaller than the signal level.

Further, according to the present invention, provided is an image capturing apparatus comprising: an image sensor; an analog-digital converter that converts an analog signal output from a pixel section of the image sensor to a digital signal using a plurality of reference signals having different slopes from each other; and a determination unit that determines a signal level at which the plurality of reference signals are changed based on a distribution of the converted digital signal, wherein the analog-digital converter performs the conversion using a reference signal having a steeper slope when the analog signal is equal to or greater than the signal level than when the analog signal is smaller than the signal level.

Furthermore, according to the present invention, provided is a control apparatus for controlling an analog-digital converter that converts an analog signal output from a pixel section of an image sensor to a digital signal using a plurality of reference signals having different slopes from each other, the control apparatus comprising: a determination unit that determines a signal level at which the plurality of reference signals are changed based on a distribution of a converted digital signal; and a notification unit that notifies the analog-digital converter of the determined signal level, wherein the analog-digital converter performs the conversion using a reference signal having a steeper slope when the analog signal is equal to or greater than the signal level than when the analog signal is smaller than the signal level.

Further, according to the present invention, provided is a signal processing method comprising: converting an analog signal output from a pixel section of an image sensor to a digital signal using a plurality of reference signals having different slopes from each other; and determining a signal level at which the plurality of reference signals are changed based on a distribution of the converted digital signal, wherein upon converting the analog signal to the digital signal, the conversion is performed using a reference signal having a steeper slope when the analog signal is equal to or greater than the signal level than when the analog signal is smaller than the signal level.

Further, according to the present invention, provided is a control method for controlling an analog-digital converter that converts an analog signal output from a pixel section of an image sensor to a digital signal using a plurality of reference signals having different slopes from each other, the method comprising: determining a signal level at which the plurality of reference signals are changed based on a distribution of a converted digital signal; and notifying the analog-digital converter of the determined signal level, wherein the analog-digital converter is controlled to perform the conversion using a reference signal having a steeper slope when the analog signal is equal to or greater than the signal level than when the analog signal is smaller than the signal level.

Further, according to the present invention, provided is a non-transitory computer-readable storage medium storing a program for causing a computer included in an image capturing apparatus to execute the steps of a control method for controlling an analog-digital converter that converts an analog signal output from a pixel section of an image sensor to a digital signal using a plurality of reference signals having different slopes from each other, the method comprises: determining a signal level at which the plurality of reference signals are changed based on a distribution of a converted digital signal; and notifying the analog-digital converter of the determined signal level, wherein the analog-digital converter is controlled to perform the conversion using a reference signal having a steeper slope when the analog signal is equal to or greater than the signal level than when the analog signal is smaller than the signal level.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 3A and 3B are timing charts illustrating AD conversion operations according to a first embodiment;

FIG. 10C is a timing chart for a case where a fixed voltage V2 is AD-converted using the first ramp signal VRAMP (gentle slope) in a dummy pixel readout period according to the first embodiment;

FIG. 10D is a timing chart for a case where the fixed voltage V2 is AD-converted using the second ramp signal VRAMP (steep slope) in a dummy pixel readout period according to the first embodiment;

DESCRIPTION OF THE EMBODIMENTS

Exemplary embodiments of the present invention will be described in detail in accordance with the accompanying drawings.

First Embodiment

Figure 1:
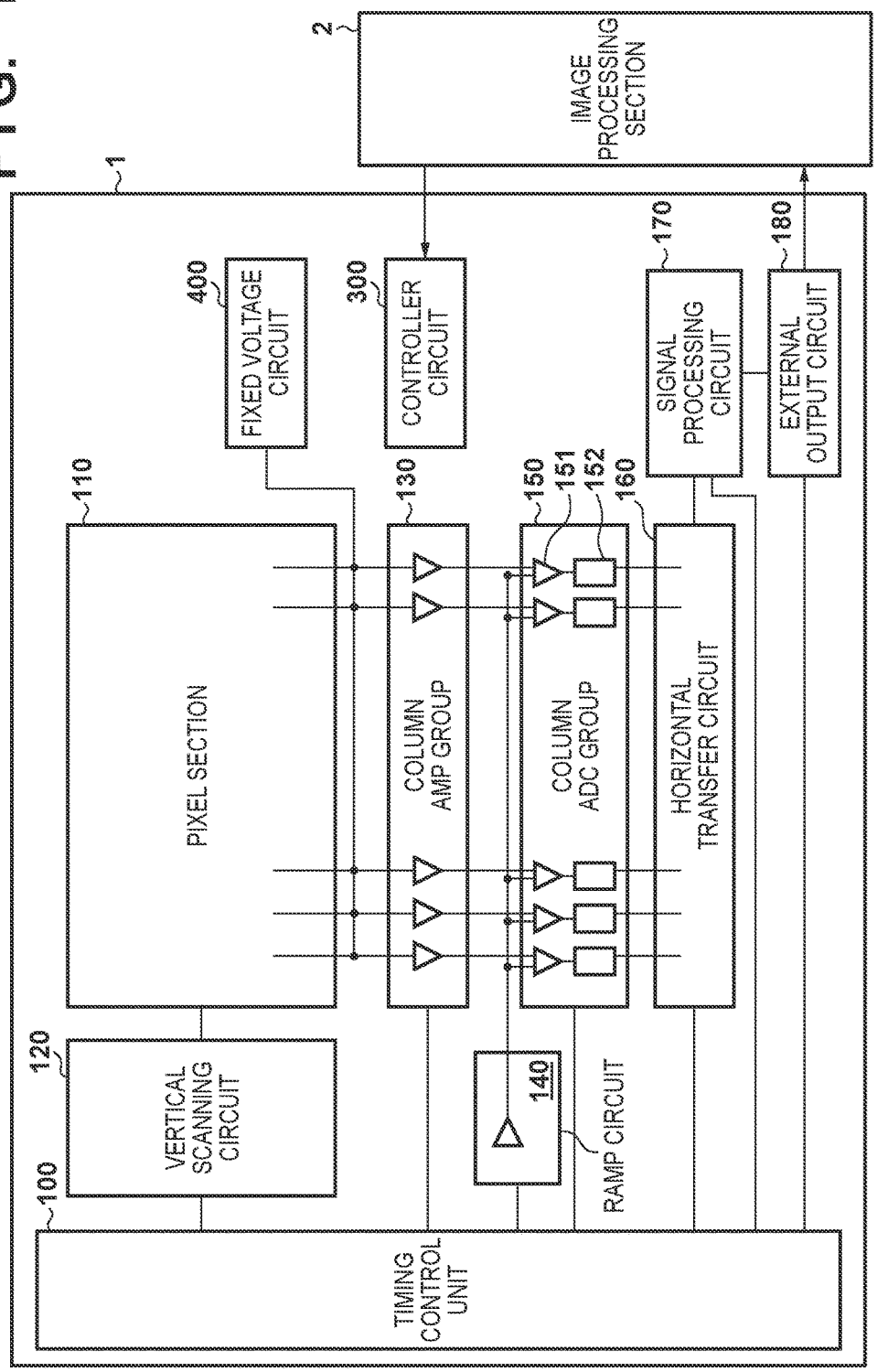
FIG. 1 is a block diagram illustrating the overall configuration of an image sensor used in an image capturing apparatus according to an embodiment of the present invention.

FIG. 1 is a block diagram illustrating the configuration of an image sensor 1 used in an image capturing apparatus according to a first embodiment of the present invention, and shows the image sensor 1 and an image processing section 2 that is an output destination for image data obtained by the image sensor 1. The image sensor 1 according to the first embodiment is a CMOS image sensor provided with a parallel-type AD converter. The image processing section 2 carries out developing processes such as white balance processing, gamma processing, and so on the image data output by the image sensor 1, and ultimately records the data into a recording medium. The image processing section 2 includes a CPU, and the CPU communicates with (through serial communication, for example) and controls the image sensor 1 in accordance with an operating mode of the image capturing apparatus.

In the image sensor 1, a timing control unit 100 controls operations of the respective blocks in the image sensor 1 by supplying operational clock signals and timing signals thereto.

A pixel section 110 includes a plurality of pixels arranged two-dimensionally, and a charge obtained by a photoelectric conversion element in each pixel carrying out a photoelectric conversion in accordance with an incident light amount is converted into a voltage and output. Each pixel is provided with a color filter and a microlens. A Bayer array cyclic structure using what is known as an RGB primary color filter including R (red), G (green), and B (blue) is typically used as the color filter, but the color filter is not necessarily limited thereto.

A vertical scanning circuit 120 carries out timing control for sequentially reading out pixel signals obtained from the pixels in the pixel section 110 in a single frame period. The readout is generally carried out sequentially by row, starting from the top row in the frame and moving down the rows.

A column amp group 130 is constituted of a plurality of column amps provided in respective columns, and is used to electrically amplify the pixel signals read out from the pixel section 110. A S/N ratio with noise produced by a ramp circuit 140, a column analog-digital converter group (column ADC group) 150, and so on in later stages is improved by amplifying the pixel signals using the column amp group 130. However, the column amp group 130 is not absolutely necessary in a circuit structure where the noise produced by the ramp circuit 140, the column ADC group 150, and so on is sufficiently low relative to the noise produced by the pixel section 110.

A fixed voltage circuit 400 supplies a fixed voltage to signal lines that connect the pixel section 110 and the column amp group 130. Although the fixed voltage circuit 400 is used in the first embodiment, a circuit that can be applied as a clip circuit or the like that clips signals at a given constant voltage may be used as well.

The ramp circuit 140 is a signal generator that generates a ramp-shaped voltage signal (ramp signal) having a constant slope in the time direction. The column ADC group 150 has a column ADC constituted of a comparison unit 151 and a counter/latch circuit 152 in each column. The comparison unit 151 compares the pixel signal (analog signal) amplified by the column amp group 130 with the ramp signal from the ramp circuit 140 and outputs a signal indicating a size relationship between the signals. Then, by the counter/latch circuit 152 latching a counter value in accordance with the signal from the comparison unit 151, an analog-digital conversion is carried out. Details of the operations carried out by the comparison unit 151 and the counter/latch circuit 152 will be given later. One row's worth of digital image data held by the counter/latch circuit 152 is read out in order from an end of the row by a horizontal transfer circuit 160.

The image data read out by the horizontal transfer circuit 160 is input into a signal processing circuit 170. The signal processing circuit 170 is a circuit that processes signals digitally, and can easily carry out gain computations by carrying out shift computations, multiplication, and so on in addition to adding an offset value of a set amount through digital processes. A pixel region that is shielded from light (an OB pixel section) may be formed in the pixel section 110, and the signal processing circuit 170 may carry out a digital black level clamping operation using signals obtained from the pixels in the OB pixel section. Furthermore, the signal processing circuit 170 controls the ramp signal output from the ramp circuit 140 through the timing control unit 100 on the basis of input image data, as will be described later.

The image data processed by the signal processing circuit 170 is passed to an external output circuit 180. The external output circuit 180 has a serializer function, and converts multi-bit input parallel signals from the signal processing circuit 170 into a serial signal. The serial signal is converted into an LVDS signal or the like, for example, and is output to the image processing section 2.

A controller circuit 300 is an I/F unit with the image processing section 2, and handles control of the image sensor 1 from the CPU of the image processing section 2 using a serial communication circuit or the like.

Figure 2A:
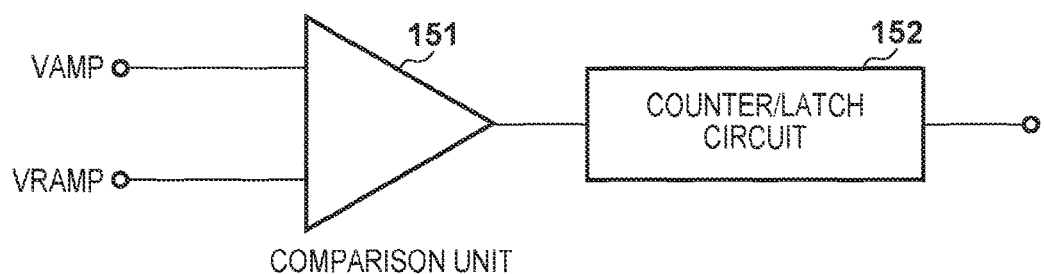
FIGS. 2A and 2B are diagrams illustrating the overall configuration and operational timing of a column amp group of the image sensor.

Next, the principles of a basic AD conversion using the column ADC group 150 of the image sensor 1 will be described using FIGS. 2A and 2B. As described above, the column ADC group 150 has the comparison unit 151 and the counter/latch circuit 152 in each column. Meanwhile, as illustrated in FIG. 2A, the comparison unit 151 compares a pixel signal VAMP output from the column amp group 130 with a ramp signal VRAMP output from the ramp circuit 140, and outputs a result of the comparison.

Figure 2B:
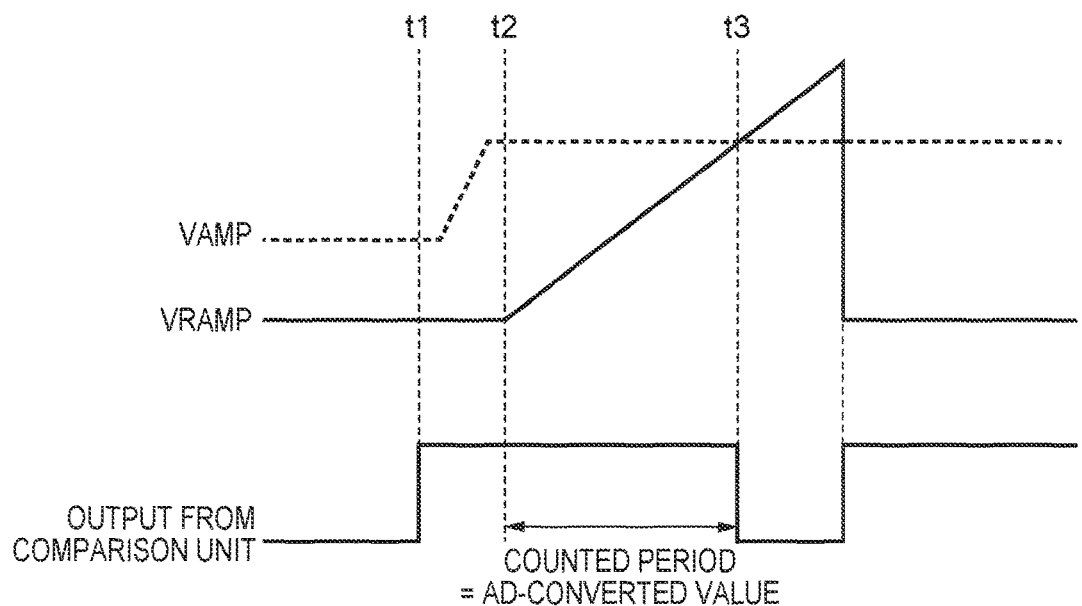

As indicated in FIG. 2B, the operations performed by the comparison unit 151 start before the start of the readout of the pixel signal VAMP from the pixel section 110 (time t1). When the operation of each column amp of the column amp group 130 stabilizes, a count value of the counter/latch circuit 152 is reset at time t2. The signal level of the ramp signal VRAMP output from the ramp circuit 140 increases as time passes following time t2, in synchronization with the count reset timing of the counter/latch circuit 152. The output of the comparison unit 151 inverts when the signal level of the ramp signal VRAMP output from the ramp circuit 140 exceeds the signal level of the pixel signal VAMP output from the column amp group 130 (time t3). The counter/latch circuit 152 carries out counting operations during a period from when the count value is reset to when the output of the comparison unit 151 inverts (from time t2 to time t3). A count value proportional to the output level of the pixel signal amplified by the column amp group 130 is obtained through these operations, and thus the count value obtained in this manner serves as an AD conversion result. Note that the method for comparing the pixel signal and the ramp signal, the method of counting performed by the counter/latch circuit, and so on described here are merely examples, and other methods may be employed as long as the period from when the count value is reset to when the output of the comparison unit 151 inverts can be detected.

FIGS. 3A and 3B are diagrams illustrating operations performed by the ramp circuit 140 and the column ADC group 150 according to the first embodiment. In FIGS. 3A and 3B, the abscissa represents time, the ordinate in the upper section of the graph represents an output level, and the lower section of the graph indicates the output of the comparison unit 151. An example in which the slope of the ramp signal VRAMP output from the ramp circuit 140 is changed in accordance with the signal level of the pixel signal VAMP from the column amp group 130 will be described with reference to FIG. 3A.

Generally, in a process that reads out a signal from a unit pixel, an N signal (noise level) is first read out and AD-converted and an S signal (noise level+signal level) is then read out and AD-converted. A signal with good S/N is then obtained by finding a difference between the S signal and the N signal converted by the signal processing circuit 170 and cancelling the noise component.

First, to AD-convert the N signal, the operations of the comparison unit 151 are started at time t11, the count of the counter/latch circuit 152 is reset at time t12, and the signal level of the ramp signal VRAMP output from the ramp circuit 140 is changed. Here, the signal level of the N signal, which is the noise level, is low, and thus a first ramp signal VRAMP (gentle slope), which has a low slope, is used in the AD conversion of the N signal. The N signal is AD-converted by carrying out counting operations during a period from when the count of the counter/latch circuit 152 is reset to when the output of the comparison unit 151 inverts (from time t12 to time t13).

Next, in a level determination period, the ramp circuit 140 outputs, to the comparison unit 151, a determination ramp signal whose maximum level is a set determination level Vs, with respect to the S signal, which is an output signal obtained by reading out a signal corresponding to a charge accumulated in the pixel section 110 and amplifying the signal using the column amp group 130. This is then compared with the S signal. Here, at time t14, the count value of the counter/latch circuit 152 is reset and the ramp circuit 140 starts outputting the determination ramp signal having the predetermined determination level Vs as the maximum level. If the signal level of the S signal is greater than or equal to the determination level Vs (S≥Vs), the output of the comparison unit 151 does not invert, and thus the count value continues to increase until the level determination period ends at time t16. In contrast to this, if the signal level of the S signal is lower than the determination level Vs (S<Vs), the output of the comparison unit 151 inverts at time t15, for example, and thus the count value stops increasing. In this manner, the signal processing circuit 170 can determine whether the signal level of the S signal is lower or not lower than the determination level Vs from the count value of the counter/latch circuit 152. Note that the timing at which the count value of the counter/latch circuit 152 is reset may be taken as the point in time when the output of the ramp circuit 140 stabilizes at the determination level Vs and the count value may be controlled to 0 in the case where the signal level of the S signal is lower than the determination level Vs (S<Vs).

In the case where the signal level of the S signal is lower than the determination level Vs, the S signal is AD-converted using the same first ramp signal VRAMP (gentle slope) as the N signal from time t17. As a result, a count value between time t17 and time t18 is obtained, in the example indicated in FIG. 3A. On the other hand, in the case where the signal level of the S signal is greater than or equal to the determination level Vs, the S signal is AD-converted using a second ramp signal VRAMP (steep slope) whose slope is α times that of the first ramp signal VRAMP (gentle slope). As a result, a count value between time t17 and time t19 is obtained, in the example indicated in FIG. 3A.

Figure 4A:
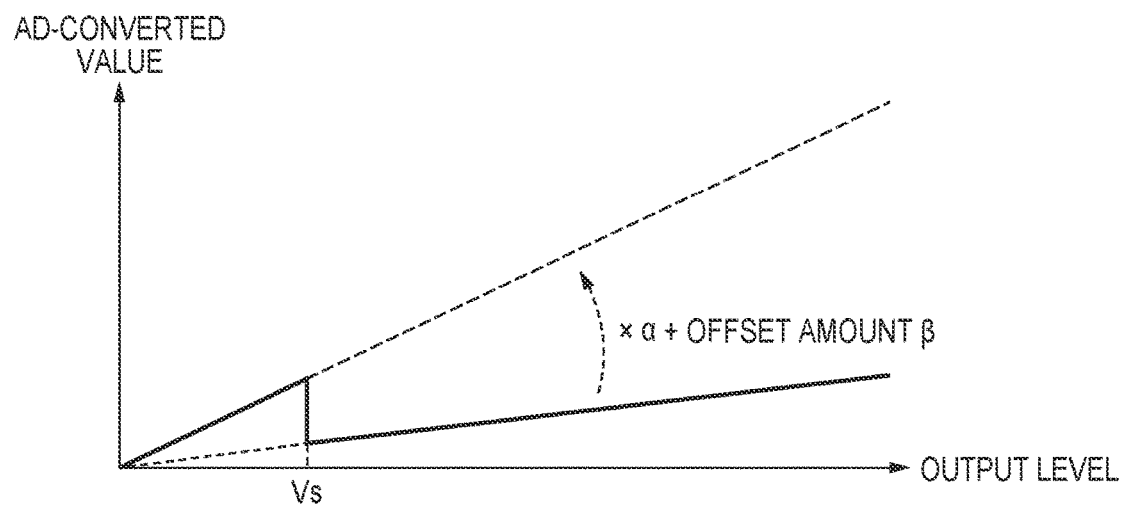
FIGS. 4A and 4B are diagrams illustrating a relationship between an output level and an AD conversion result in the case of using ramp signals having different slopes depending on a signal level.
Figure 4B:
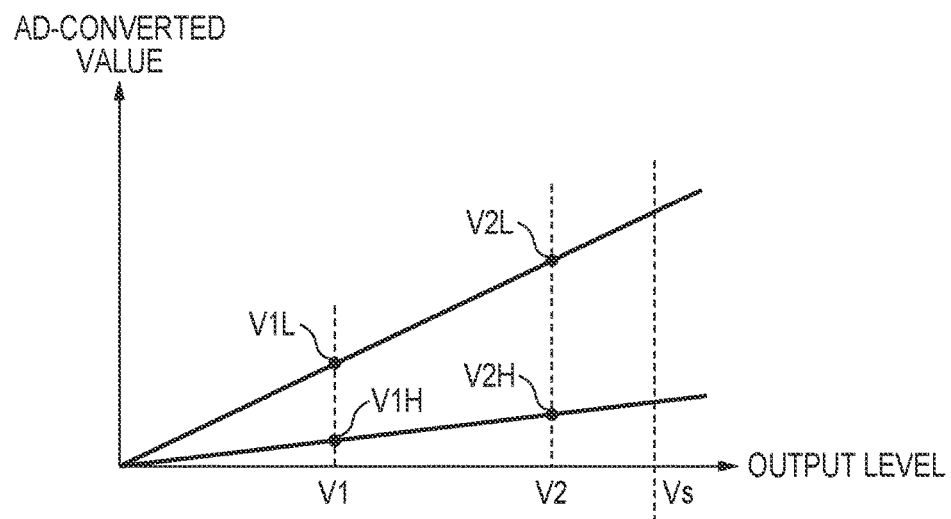

FIGS. 4A and 4B are diagrams illustrating a relationship between the signal level of an output signal and an AD conversion result in the case of using ramp signals having different slopes depending on an output level. In FIGS. 4A and 4B, the abscissa represents an output signal level of the column amp group 130, and the ordinate represents a digital value obtained by AD-converting the S signal. The solid line represents the digital value (AD-converted value) AD-converted by the comparison unit 151 and the counter/latch circuit 152, and input into the signal processing circuit 170 through the horizontal transfer circuit 160. As described above, an S signal whose signal level is lower than the determination level Vs is AD-converted using the first ramp signal VRAMP (gentle slope), whereas an S signal whose signal level is greater than or equal to the determination level Vs is AD-converted using the second ramp signal VRAMP (steep slope). Accordingly, as illustrated in FIG. 4A, the post-AD conversion S signal does not coincide before and after the determination level Vs.

Accordingly, first, the signal processing circuit 170 multiplies the AD-converted value of the S signal whose signal level is higher than the determination level Vs by a ratio α between the slopes of the first ramp signal VRAMP (gentle slope) and the second ramp signal VRAMP (steep slope). Furthermore, the signal level of the pixel signal corresponding to the incident light amount and the AD-converted value are corrected to a first order relationship by adding an offset amount β in order to eliminate a gap at the determination level Vs.

If a video from effective pixels is output in a state where the aforementioned correction is not carried out, an unnatural video in which gaps remain at a given brightness will result. An ideal target correction value changes depending on the temperature of the image sensor, the driving timing of the image sensor (the gain, operation state, and so on of the column amp group 130), and driving settings (power source settings and the like), and thus it is necessary to obtain the correction value immediately before shooting an image or to obtain the correction value regularly. The obtaining method of the correction value will be described later.

Figure 5:
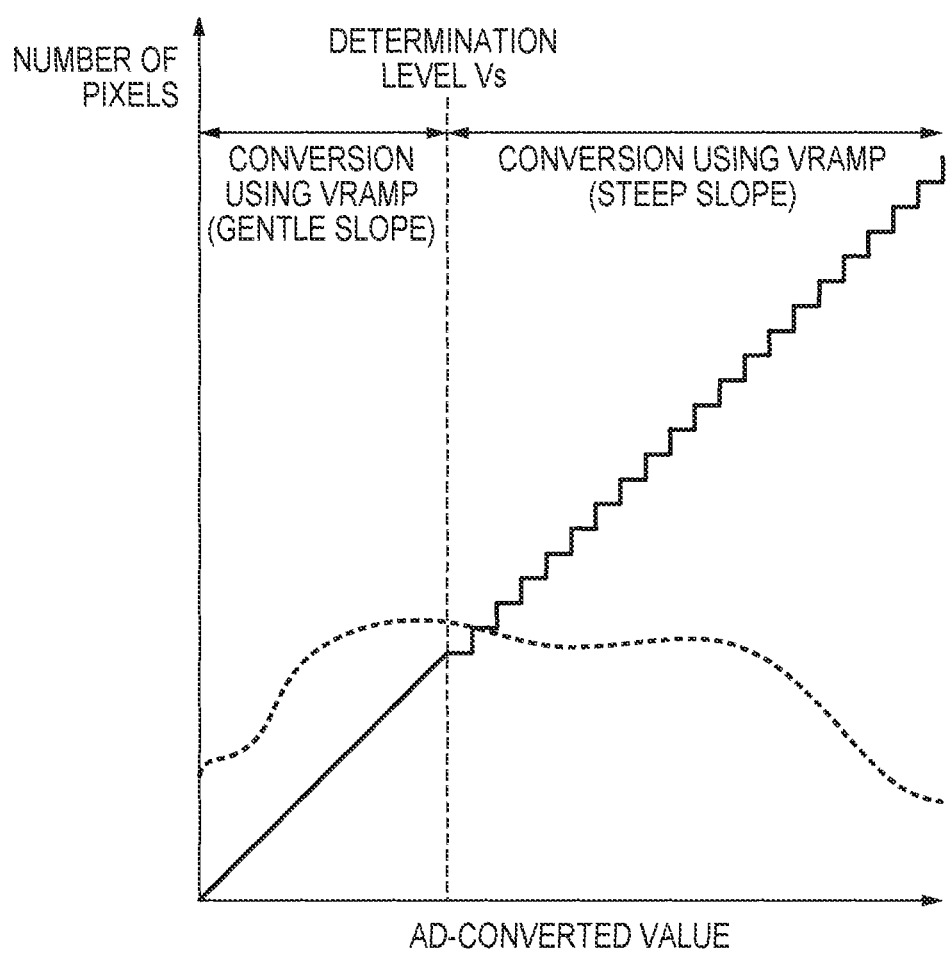
FIG. 5 is a diagram illustrating a relationship between a histogram and AD converted values according to the first embodiment.

Next, a setting method of the determination level Vs according to the first embodiment will be explained with reference to FIGS. 5 to 7. In the first embodiment, the image processing section 2 generates a histogram indicating a distribution of AD-converted values of an obtained image, and analyzes the shape of the histogram. In FIG. 5, the abscissa represents AD-converted values, and the ordinate represents the number of pixels having each AD-converted value, and a broken line shows a generated histogram.

Although the shape of a histogram greatly changes depending upon a shot subject, a particular histogram shown in FIG. 5 contains signal levels in good balance from a small AD-converted value (dark) to a large AD-converted value (bright), which indicates that the contrast of an image is high. In this case, the number of pixels having AD-converted values near the determination level Vs at which the first ramp signal VRAMP (gentle slope) and the second ramp signal VRAMP (steep slope) are switched is not large.

Figure 6A:
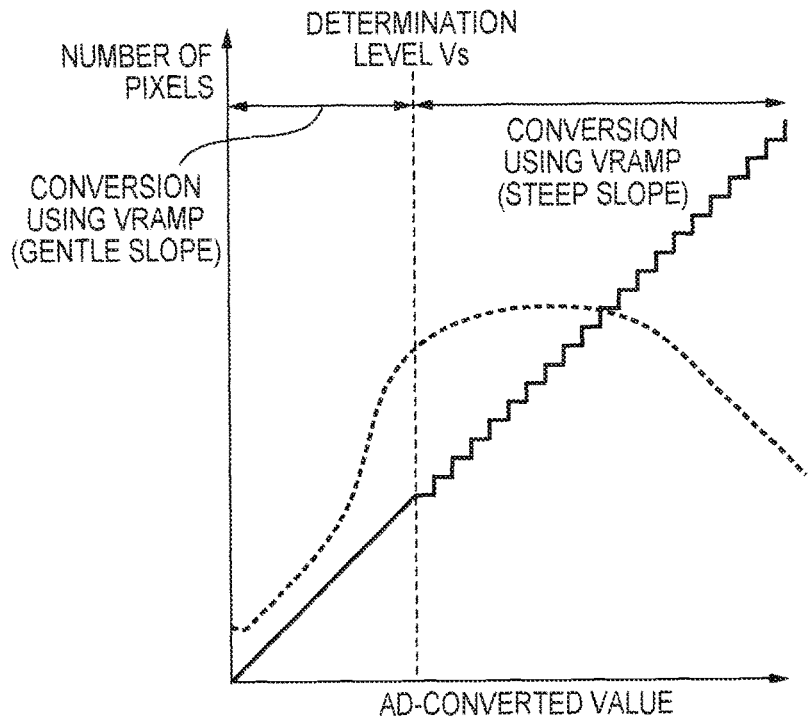
FIGS. 6A and 6B are diagrams illustrating relationships between histograms and AD converted values in a case where the number of pixels having signal levels corresponding to a bright portion is relatively large according to the first embodiment.
Figure 6B:
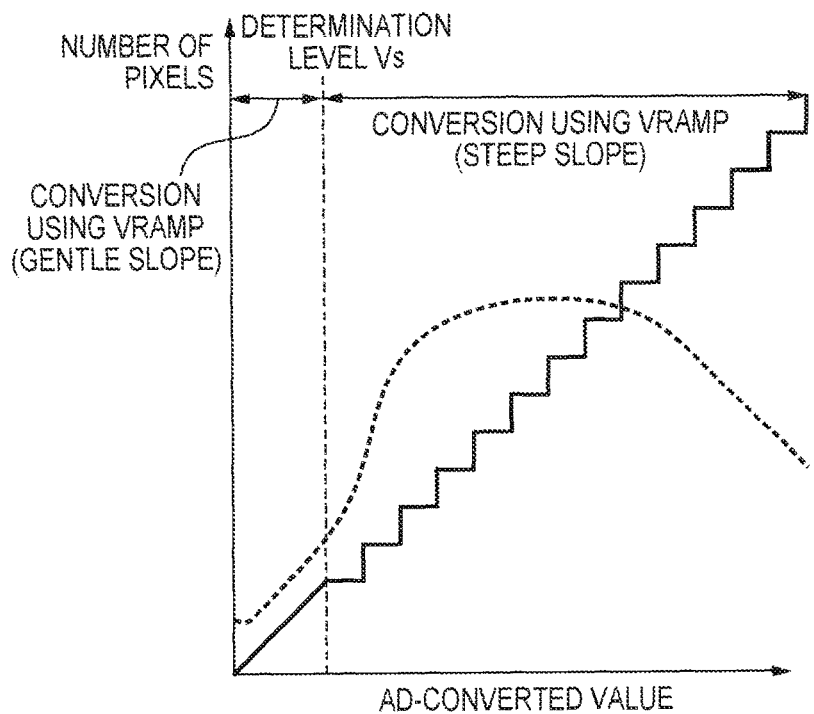

By contrast, FIG. 6A shows a histogram of a so-called "high-key" image including the relatively large number of pixels having high signal levels that represent a bright portion. In this case, as shown in FIG. 6B, by moving the determination level Vs toward the dark side, it is possible to reduce the number of pixels having signal levels to be AD-converted near the determination level Vs.

Figure 7A:
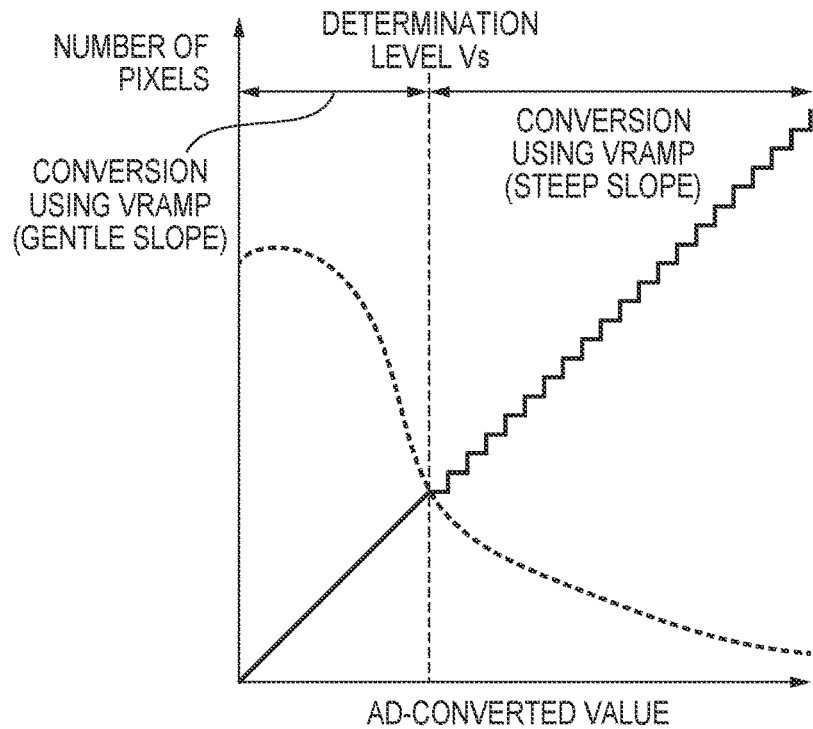
FIGS. 7A and 7B are diagrams illustrating relationships between histograms and AD converted values in a case where the number of pixels having signal levels corresponding to a dark portion is relatively large according to the first embodiment.
Figure 7B:
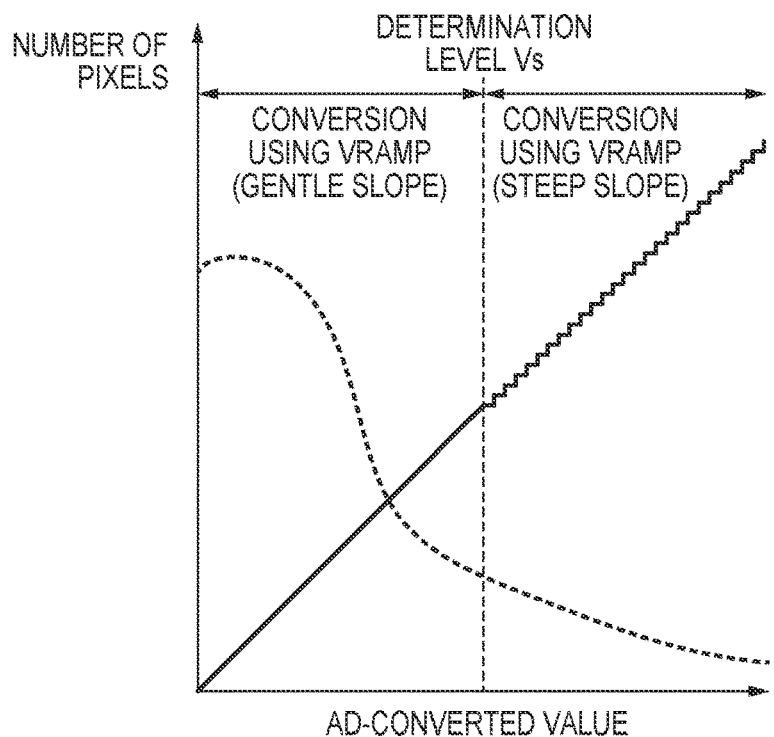

On the contrary, FIG. 7A shows a histogram of a so-called low luminance image including the relatively large number of pixels having low signal levels that represent a dark portion. In this case, as shown in FIG. 7B, by moving the determination level Vs toward the bright side, it is possible to reduce the number of pixels having signal levels to be AD converted near the determination level Vs.

As described above, the image processing section 2 generates a histogram of AD-converted values, analyzes the generated histogram to determine whether or not its shape is biased either to a bright portion or a dark portion, and, if biased, shifts the determination level Vs toward the side where the frequency in the histogram is small by a predetermined amount of level. In this manner, the determination level Vs is changed in accordance with the characteristics of an image.

It should be noted that the slope of the first ramp signal VRAMP (gentle slope) may be changed when the determination level Vs is changed. FIG. 3B shows a chart in a case where the first ramp signal VRAMP (gentle slope) output from the ramp circuit 140 is changed. Compared to the diagram shown in FIG. 3A, the slope of the first ramp signal VRAMP (gentle slope) is increased at the same time that the determination level Vs is increased. The AD-converted values using the first ramp signal VRAMP (gentle slope) shown in FIG. 3B are smaller than the AD-converted values using the first ramp signal VRAMP (gentle slope) shown in FIG. 3A. In addition, as a ratio between the slopes changes from α in FIG. 3A to α' in FIG. 3B, it is necessary to calculated the correction value α' and a corresponding offset amount β.

Figure 8A:
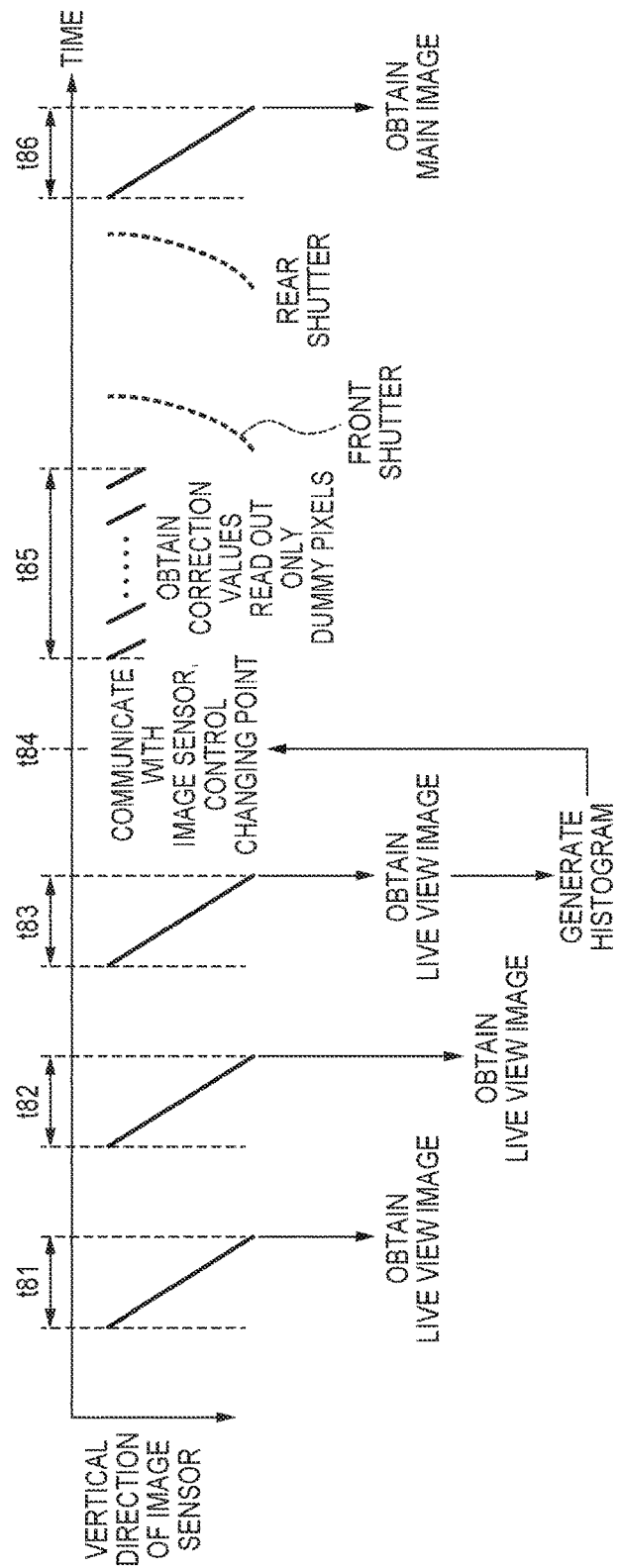
FIGS. 8A and 8B are diagrams illustrating timings at which a determination level is changed according to the first embodiment and a second embodiment.

Next, a description is given of an operation of the image capturing apparatus with reference to a timing chart shown in FIG. 8A. Here, a still image capturing apparatus, such as a digital single-lens reflex camera and digital camera, will be explained. In FIG. 8A, an abscissa indicates time, and an ordinate indicates readout timing of pixel rows in the vertical direction of the image sensor 1.

Recently, there are digital single-lens reflex cameras and digital cameras having a live view function. The live view function is realized by continuously causing light to be incident on the image sensor 1 with mirror up, outputting one frame's worth analog signal at a predetermined period, and displaying an image based on the obtained image signal on a liquid crystal monitor, or the like. The user can observe the displayed image. The periods t81, t82, t83 in FIG. 8A indicate periods when the live view images are read out. Then, at the time of capturing a still image (main image), the image capturing apparatus drives a front shutter and a rear shutter. Note that these shutters are not necessarily mechanical shutters, but may be realized by an electronic shutter controlled within the image sensor 1.

Before performing main image shooting, exposure conditions when performing the main image shooting, such as an F-value of a lens, a time from when the front shutter is driven until when the rear shutter is driven (shutter speed), and so forth, are determined from a live view image obtained immediately before the front shutter is driven. At timing t84, the image processing section 2 communicates with the image sensor 1 to reflect the determined exposure conditions in the image sensor 1. In addition, a histogram is generated in the image processing section 2 using the live view image readout during period t83 that is immediately before the front shutter is driven. Then, based on the generated histogram of the live view image, the image processing section 2 determines the determination level Vs is and notifies the image sensor 1 of the determination level Vs, and the determination level Vs is reflected at time t84. At this time, the slope of the ramp signal VRAMP (gentle slope) may be controlled as shown in FIG. 3B.

In period t85, as will be described later, the ratio α at the time of AD conversion and an offset amount β to be added are calculated using signals output from a dummy pixel region included in the image sensor 1. Thereafter, the front shutter and the rear shutter are driven, and the main image is read out(period t86).

Next, a method for calculating the ratio α between the slopes and the offset amount β after the determination level Vs and the slopes of the first ramp signal VRAMP (gentle slope) and the second ramp signal VRAMP (steep slope) are controlled based on the analysis result of the histogram, will be described. An operation of calculating these correction values is referred to as "correction value acquisition operation", hereinafter.

Figure 9:
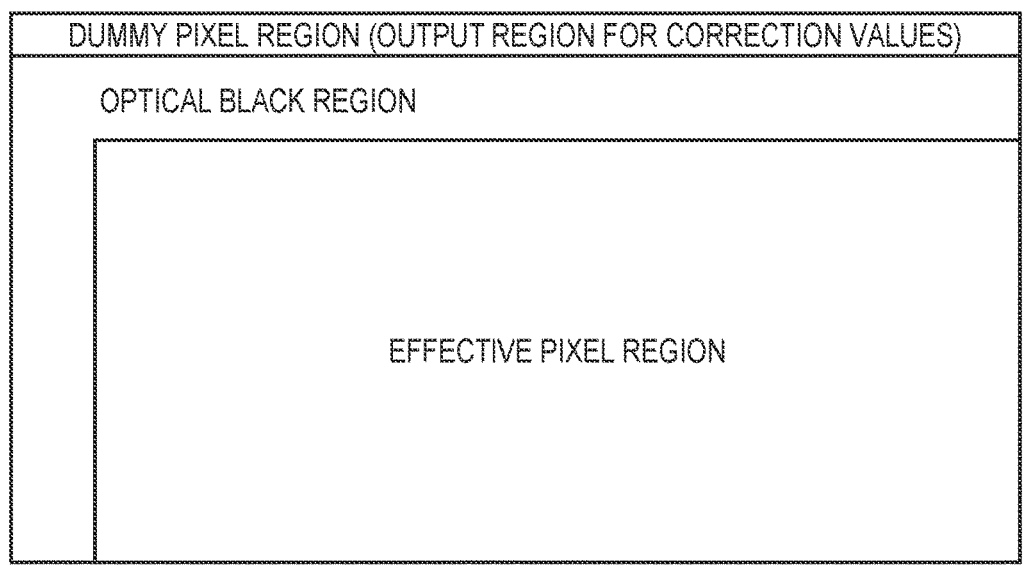
FIG. 9 is a diagram illustrating an example of the configuration of a pixel section of the image sensor according to the first embodiment.

FIG. 9 illustrates an example of the configuration of the pixel section 110. In this pixel configuration, a dummy pixel region lacking photodiodes is provided in the uppermost area, and an optical black (OB) region that is shielded from light and an effective pixel region that output signals obtained through photoelectric conversion are arranged in that order therebelow. In the first embodiment, pixel signals from the dummy pixels are used for calculating the ratio α between the slopes and the offset amount β. Here, control is carried out so that the fixed voltage from the fixed voltage circuit 400 is input in a pixel signal readout period for the dummy pixels, and the voltage input into the comparison unit 151 from the column amp group 130 reaches a given fixed voltage. Note that the voltages V1 and V2, which are lower than the determination level Vs, are used as the fixed voltage in the first embodiment.

Figure 10A:
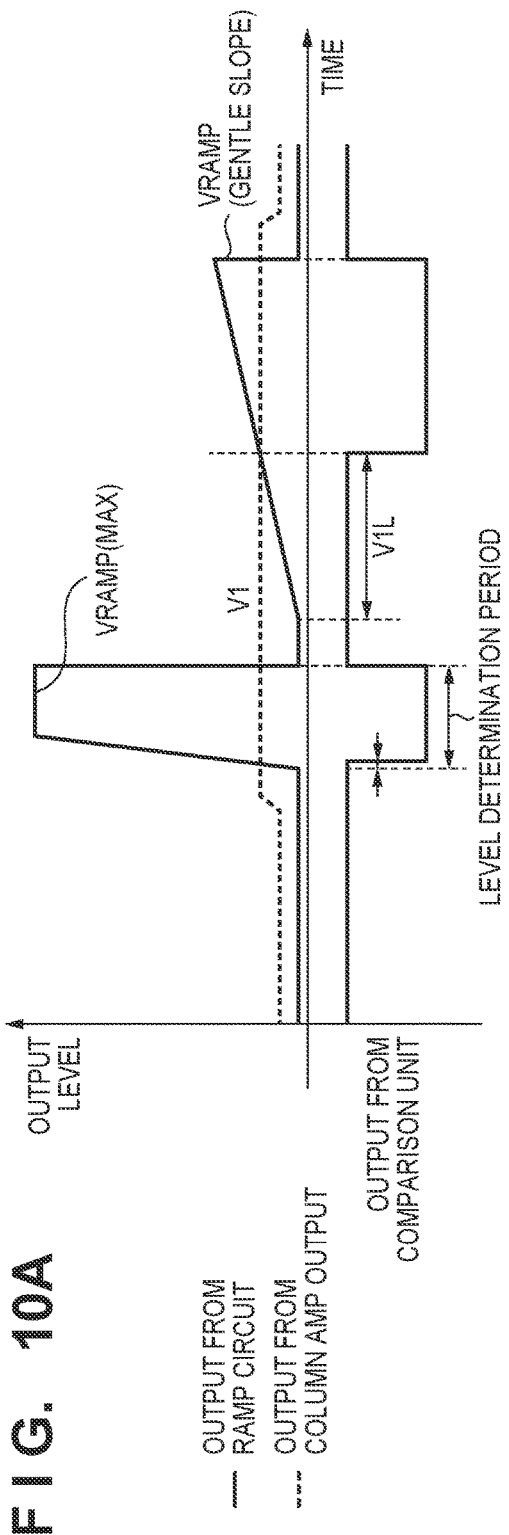
FIG. 10A is a timing chart for a case where a fixed voltage V1 is AD-converted using a first ramp signal VRAMP (gentle slope) in a dummy pixel readout period according to the first embodiment.

An AD conversion process carried out in the dummy pixel readout period will be described with reference to FIGS. 10A to 10D. In FIG. 10A, the fixed voltage V1 is AD-converted. Note that unlike the process described with reference to FIGS. 3A and 3B, it is not necessary to provide a period for AD-converting the N signal. As illustrated in FIG. 10A, the fixed voltage V1 is AD-converted using the first ramp signal VRAMP (gentle slope), whose slope is low, by raising the ramp signal VRAMP output from the ramp circuit 140 during the level determination period to a maximum value VRAMP(MAX). The result of the AD conversion is represented by V1L.

Figure 10B:
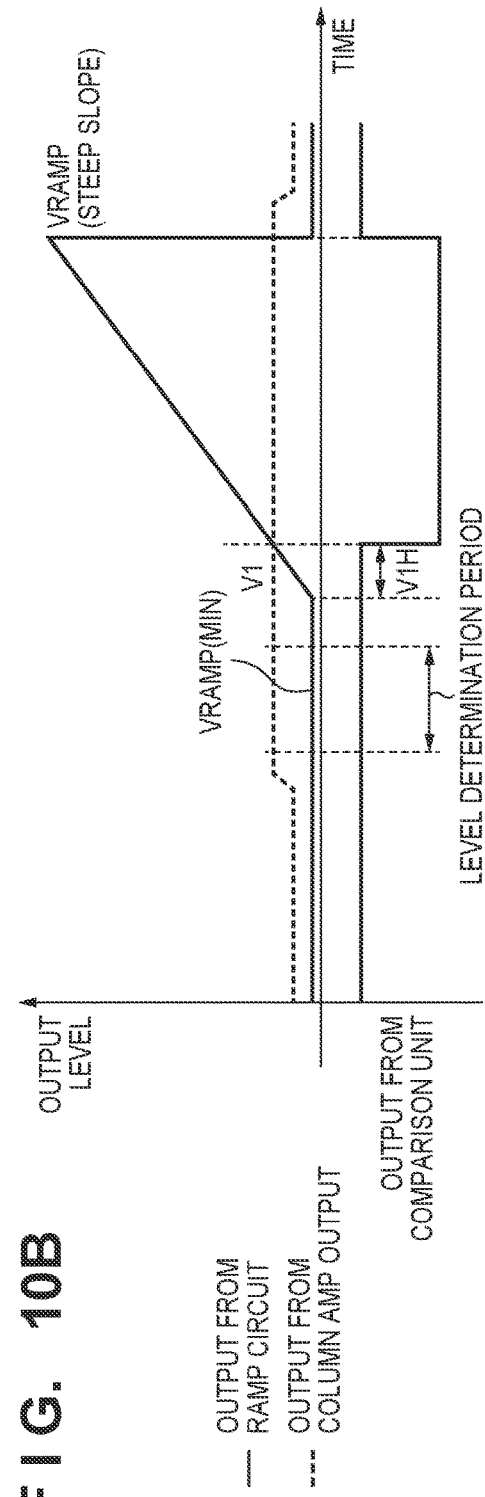
FIG. 10B is a timing chart for a case where the fixed voltage V1 is AD-converted using a second ramp signal VRAMP (steep slope) in a dummy pixel readout period according to the first embodiment.

Next, as illustrated in FIG. 10B, the fixed voltage V1 is AD-converted using the second ramp signal VRAMP (steep slope), whose slope is high, by setting the ramp signal VRAMP output from the ramp circuit 140 during the level determination period to a minimum value VRAMP(MIN). The result of the AD conversion is represented by V1H.

Thereafter, as illustrated in FIGS. 10C and 10D, the fixed voltage is changed to the voltage V2 that is higher than the voltage V1, and the same AD conversion as illustrated in FIGS. 10A and 10B is carried out. The results thereof are represented by V2L and V2H, respectively.

This is represented as illustrated in FIG. 4B, when the abscissa represents an output level and the ordinate represents the AD-converted value. FIG. 4B indicates, in an enlarged manner, the area of FIG. 4A where the output signal level is lower than the determination level Vs. The slope ratio α and the offset amount β can be found from these four coordinate points. The slope ratio α can be found from the following Formula (1), for example.

$$\alpha = (V2L - V1L)/(V2H - V1H) \quad (1)$$

After finding the slope ratio α, the offset amount β can be found from the following Formula (2) such that two straight lines intersect at the determination level Vs.

$$\beta = (V2L - V1L)/(V2 - V1) \times Vs$$

$$-\alpha = (V2H - V1H)/(V2 - V1) \times Vs \quad (2)$$

The above calculation of the correction values α and β may be carried out within the image sensor 1, or may be carried out by the image processing section 2.

According to the first embodiment as described above, it is possible to reduce the number of pixels having signal levels to be AD-converted near the determination level by analyzing the distribution (histogram) of AD-converted values. As a result, it is possible to reduce unnaturalness in an image due to changeover of ramp signals.

Second Embodiment

Figure 8B:
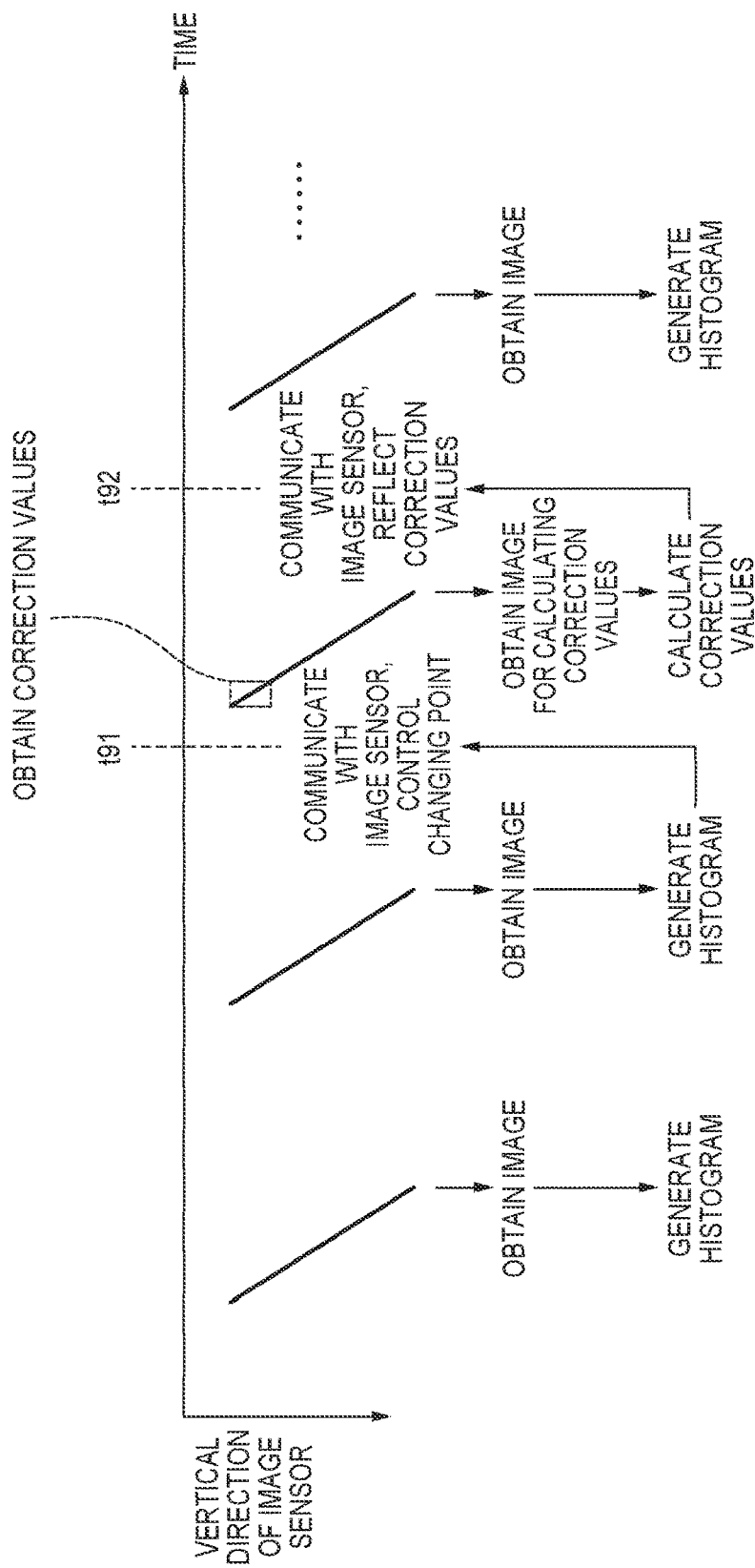

In the first embodiment as described above, generation of a histogram and calculation of correction values are performed using a live view image obtained before the main image shooting operation. By contrast, in a case where images are obtained by a video camera, for example, without distinguishing between a live view image and a main image, an operation as shown in FIG. 8B is performed. Similarly to FIG. 8A, an abscissa and ordinate in FIG. 8B respectively represent time and readout timing of pixel rows in the vertical direction of the image sensor 1.

In an image capturing apparatus, as represented by a video camera, an image is captured in every frame at a set frame rate. When an image is captured and the image processing section 2 generates a histogram for each frame and then the distribution of the generated histogram is as any of those shown in FIGS. 6A, 6B, 7A and 7B which cause to shift the determination level Vs, the determination level Vs of the image sensor 1 is determined, and the determined determination level Vs is reflected in the image sensor 1 at timing t91. At this time, as shown in FIG. 3B, the slope of the first ramp signal VRAMP (gentle slope) may be controlled as well.

Here, in a frame when the above change is reflected, the ratio α between slopes of the ramp signals and the offset amount β have not been calculated, and an image having a gap is output. In this output frame, the ratio α between slopes of the ramp signals and the offset amount β are calculated, and these correction values are reflected at timing t92.

Normal images are obtained from the frame next to the frame at which the correction values are reflected. Here, a frame rate is high in a video camera (typically, 60 fps or 120 fps, recently), and the gap in one frame image does not affect appearance of a video.

According to the second embodiment as described above, it is possible for an image capturing apparatus, such as a video camera, that consecutively reads out images to reduce the number of pixels having signal levels to be AD-converted near the determination level.

Third Embodiment

In the first and second embodiments, a histogram is generated based on AD-converted values of an entire output image. However, a histogram may be generated for a partial region of interest of an image. The partial region of interest indicates a main subject, which includes, for example, a focused region, a region where a face of a person is detected, a region designated on a touch panel on a liquid crystal monitor, and so forth.

Figure 11A:
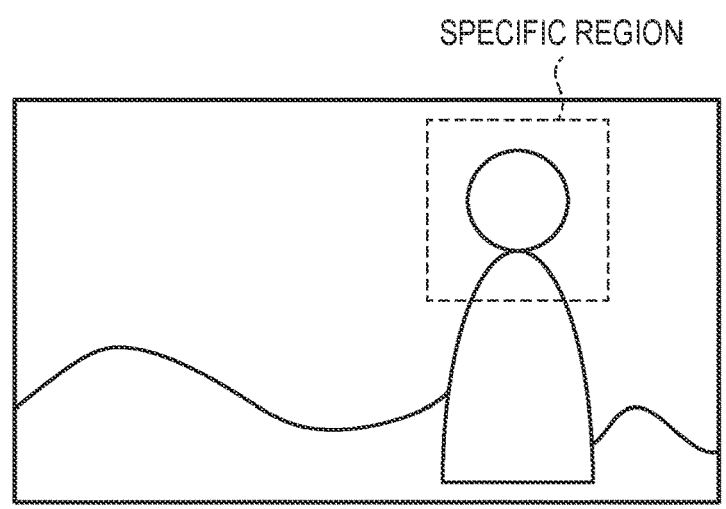
FIGS. 11A and 11B are diagrams illustrating an example of an image and a relationship between a histogram and AD-converted values according to a third embodiment.
Figure 11B:
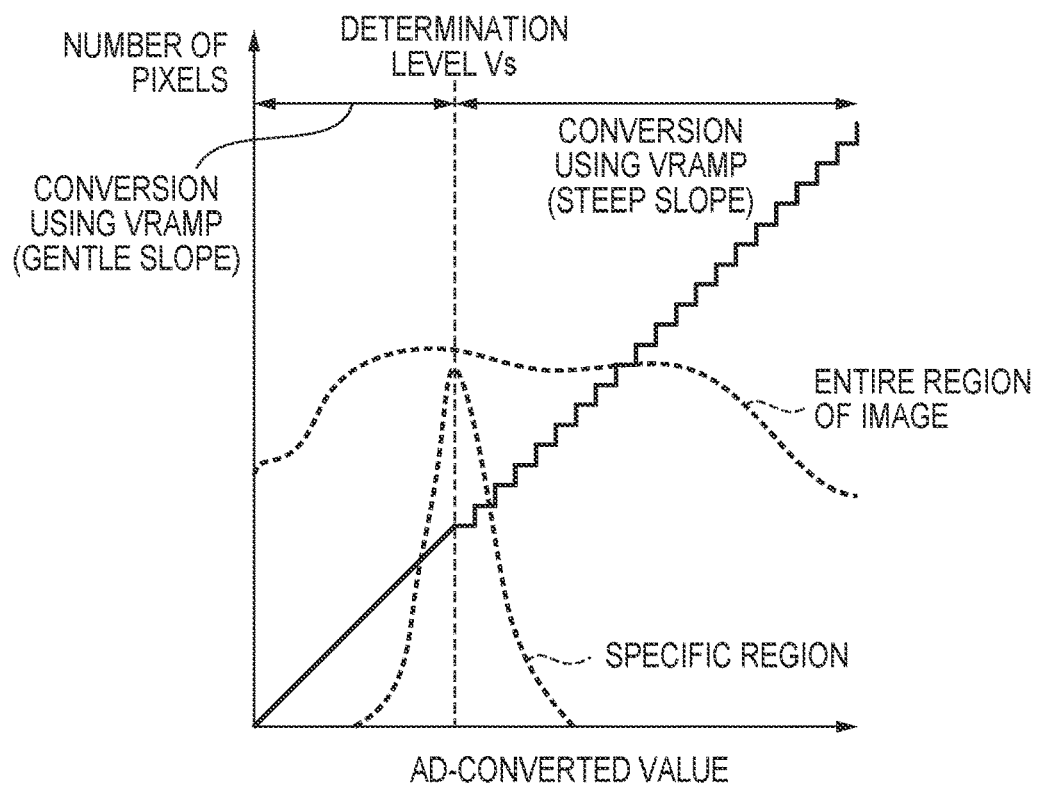

FIG. 11A shows an output image from an image capturing apparatus. FIG. 11B is a histogram of the image shown in FIG. 11A. Contrast of the entire image is high, and there seems no need to change the determination level Vs. However, if a histogram of a specific region (e.g., a face of a person) in the image shown in FIG. 11A indicates that the number of pixels having signal levels near the determination level Vs is large as shown in FIG. 11B, the determination level Vs is changed as described above in the first embodiment.

Figure 12:
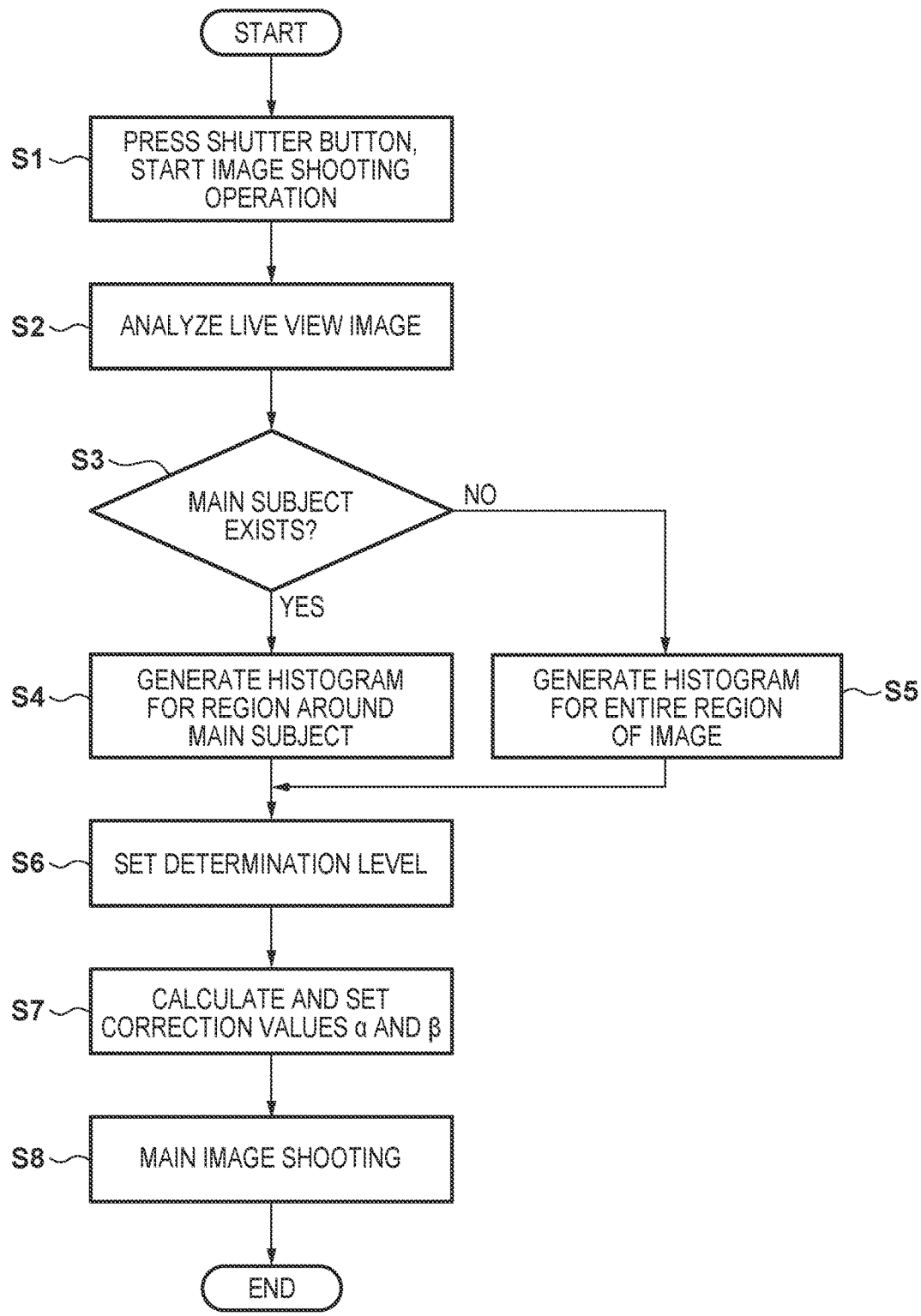
FIG. 12 is a flowchart of an image shooting processing according to the third embodiment.

FIG. 12 is a flowchart of an image shooting processing according to a third embodiment. When a user presses a shutter button of the image capturing apparatus in step S1, the image shooting operation starts.

In step S2, a live view image is obtained before the front shutter and the rear shutter are driven. Then, the obtained live view image is analyzed in the image processing section 2, and whether or not a main subject exists is determined. Here, the main subject may be a focused region, a region where a face of a person is detected, a region designated on a touch panel on a liquid crystal monitor, and so forth, as described above.

If it is determined in step S3 that the main subject exists, the image processing section 2 generates a histogram for a region around the main subject in step S4. On the other hand, if no main subject exists, the image processing section 2 generates a histogram for the entire region of the image in step S5. In step S6, the image processing section 2 determines the determination level Vs and, if possible, the slope of the first ramp signal VRAMP (gentle slope) based on the generated histogram, then controls the image sensor 1.

Next in step S7, a correction value acquisition operation is performed in order to obtain the ratio α between the slopes and the offset amount β for the determination level Vs and the slopes of the ramp signals that are reflected in step S6, and main image shooting is performed after obtaining the correction values (step S8).

According to the third embodiment as described above, it is possible to reduce the number of pixels having signal levels to be AD-converted near the determination level in a region of interest in an image by generating a histogram for the region of interest, and changing the determination level suitable to the region of interest. As a result, it is possible to reduce unnaturalness in the region of interest in the image due to changeover of ramp signals.

It should be noted that, in the first to third embodiments as described above, either the first ramp signal VRAMP (gentle slope) or the second ramp signal VRAMP (steep slope) is selected based on one determination level Vs. However, the present invention is not limited to this, and a plurality of determination levels may be set, and a ramp signal may be selected from three or more different ramp signals.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-040440, filed on Mar. 2, 2016, which is hereby incorporated by reference herein in its entirety.

What is claimed is:

1. An image sensing apparatus comprising:
   a pixel section;
   an analog-digital converter that converts an analog signal output from the pixel section to a digital signal using one of a plurality of reference signals having different slopes from each other;

an analysis unit that analyzes a distribution of the digital signal; and a controller that changes a signal level for selecting one of the plurality of reference signals to be used for conversion by the analog-digital converter based on a bias condition of the distribution of the digital signal.

2. The image sensing apparatus according to claim 1, wherein the controller changes the signal level based on the bias condition of the distribution of the digital signal corresponding to an entire region of the pixel section.

3. The image sensing apparatus according to claim 1 further comprising a setting unit that sets a partial region of the pixel section, wherein the controller changes the signal level based on the bias condition of the distribution of the digital signal corresponding to the partial region.

4. The image sensing apparatus according to claim 3 further comprising a detection unit that detects a main subject from the digital signal obtained from an entire region of the pixel section, wherein the partial region is a region of the main subject.

5. The image sensing apparatus according to claim 3 further comprising a designation unit that designates the partial region.

6. The image sensing apparatus according to claim 1, further comprising:

a voltage supply unit that supplies analog signals of a plurality of predetermined different output levels to the analog-digital converter; and a calculation unit that calculates a correction value for correcting the digital signal based on a plurality of digital signals obtained by converting the analog signals of the plurality of different output levels using the plurality of reference signals.

7. The image sensing apparatus according to claim 6, wherein the correction value includes a ratio between slopes of the plurality of reference signals and an offset amount.

8. The image sensing apparatus according to claim 1, further comprising a reference signal output unit that outputs the plurality of reference signals, wherein the plurality of reference signals include a first reference signal and a second reference signal whose slope is steeper than the first reference signal, and the reference signal output unit changes the slope of the first reference signal based on the bias condition of the distribution of the digital signal.

9. The image sensing apparatus according to claim 1, wherein the pixel section outputs one frame's worth of analog signals at a predetermined period, and in case where recording of a still image is designated, the analysis unit analyzes the distribution of the digital signal converted from the one frame's worth of analog signals obtained immediately before the designation is performed, and determines the signal level.

10. The image sensing apparatus according to claim 1, wherein the pixel unit outputs one frame's worth of analog signals at a predetermined period, and the analysis unit analyzes the distribution of the digital signal at the predetermined period and, in a case where the signal level has changed based on a result of the analysis, notifies the analog-digital converter of the changed signal level.

11. The image sensing apparatus according to claim 1, wherein the analog-digital converter performs the conversion using a reference signal having a steeper slope when the analog signal is equal to or greater than the signal level than when the analog signal is smaller than the signal level.

* * * * *